United States Patent Office 3,525,687
Patented Aug. 25, 1970

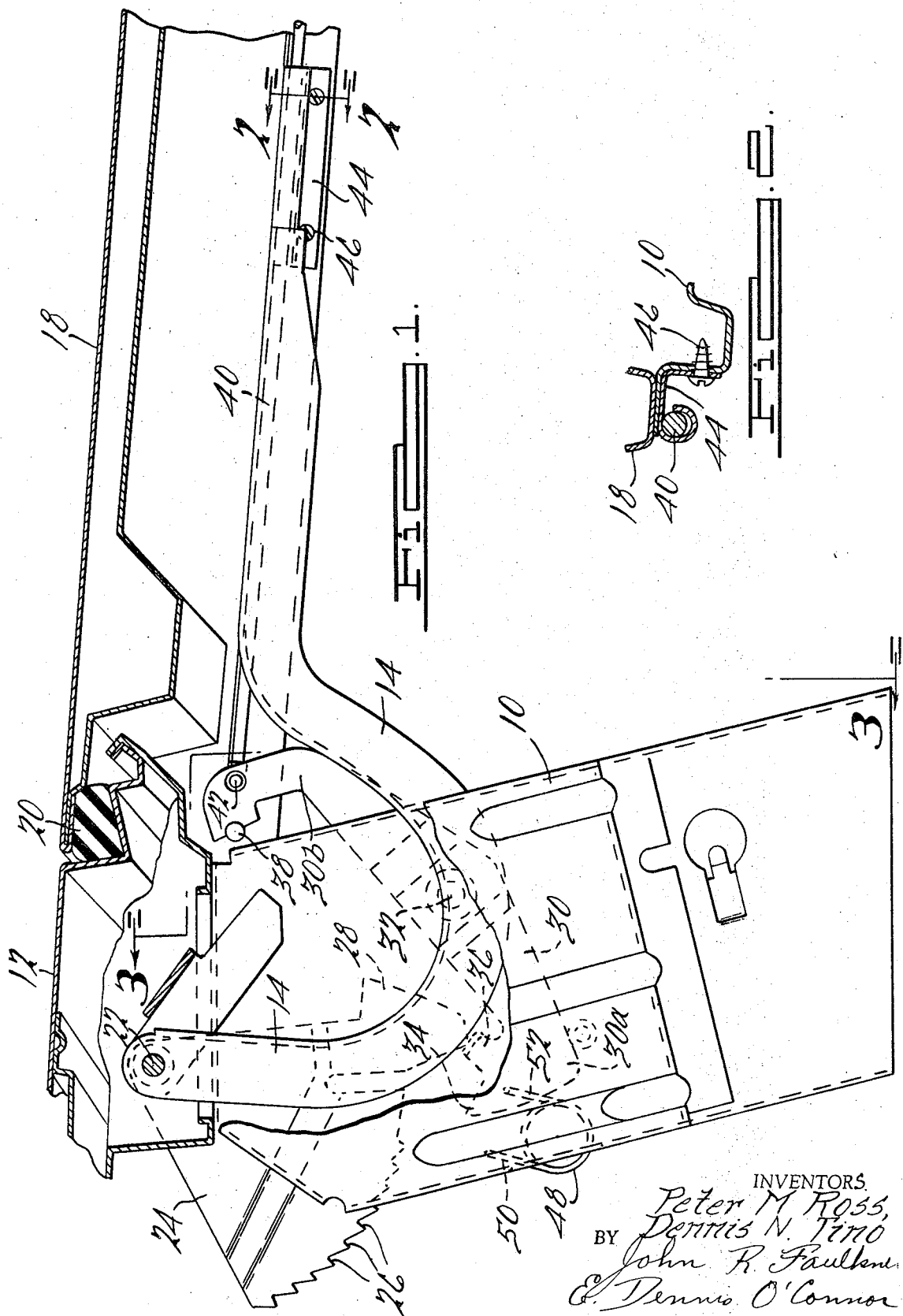

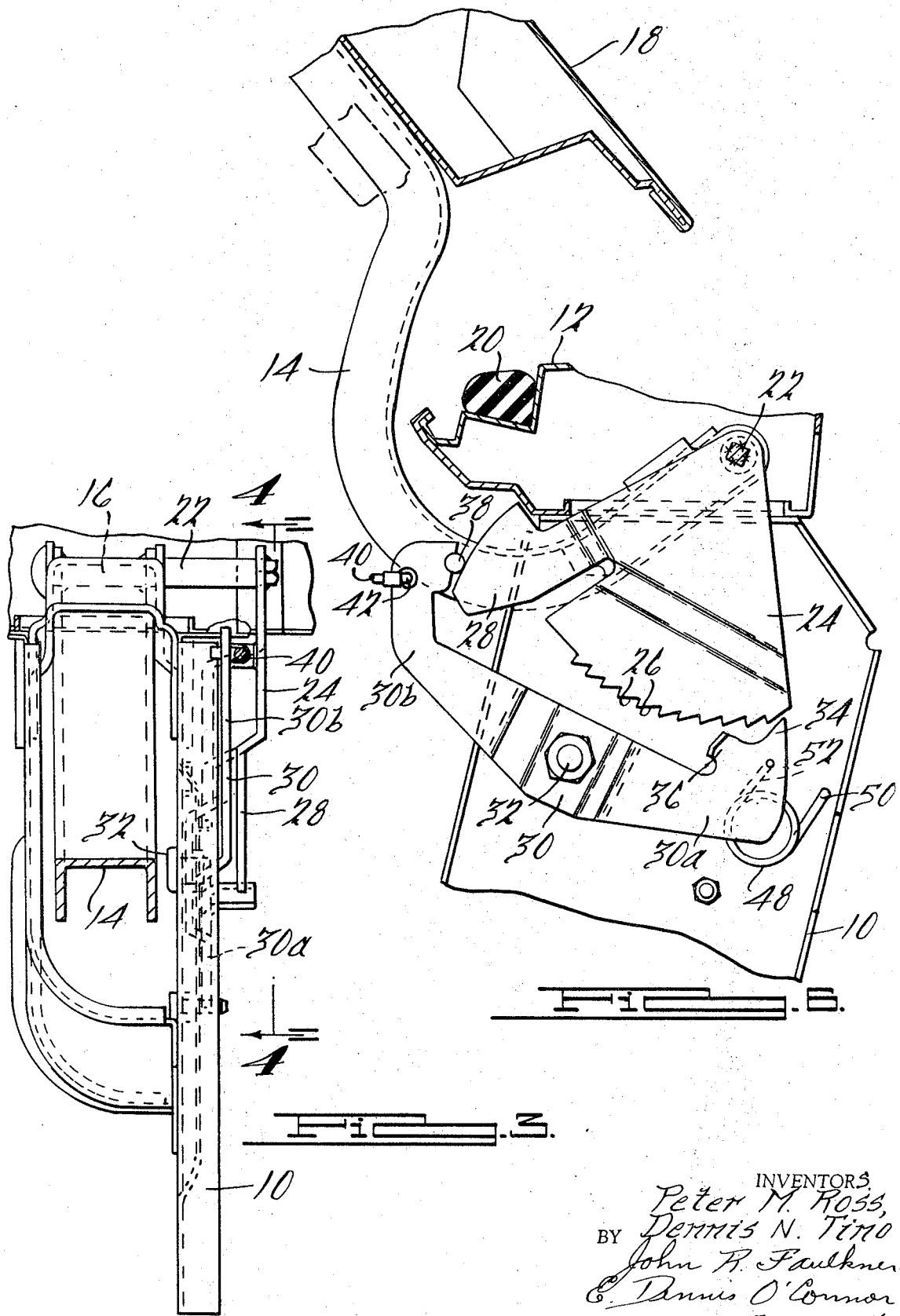

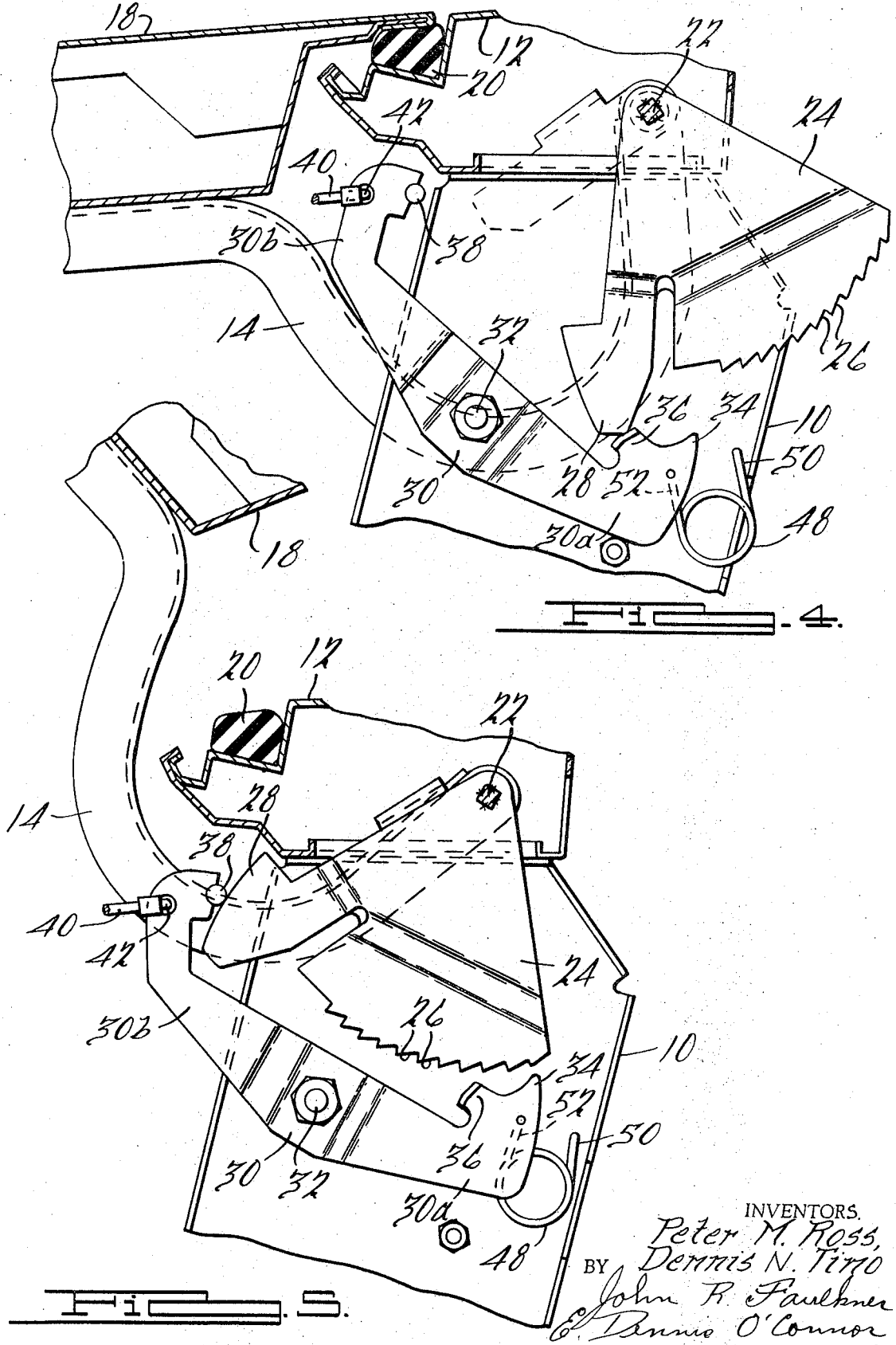

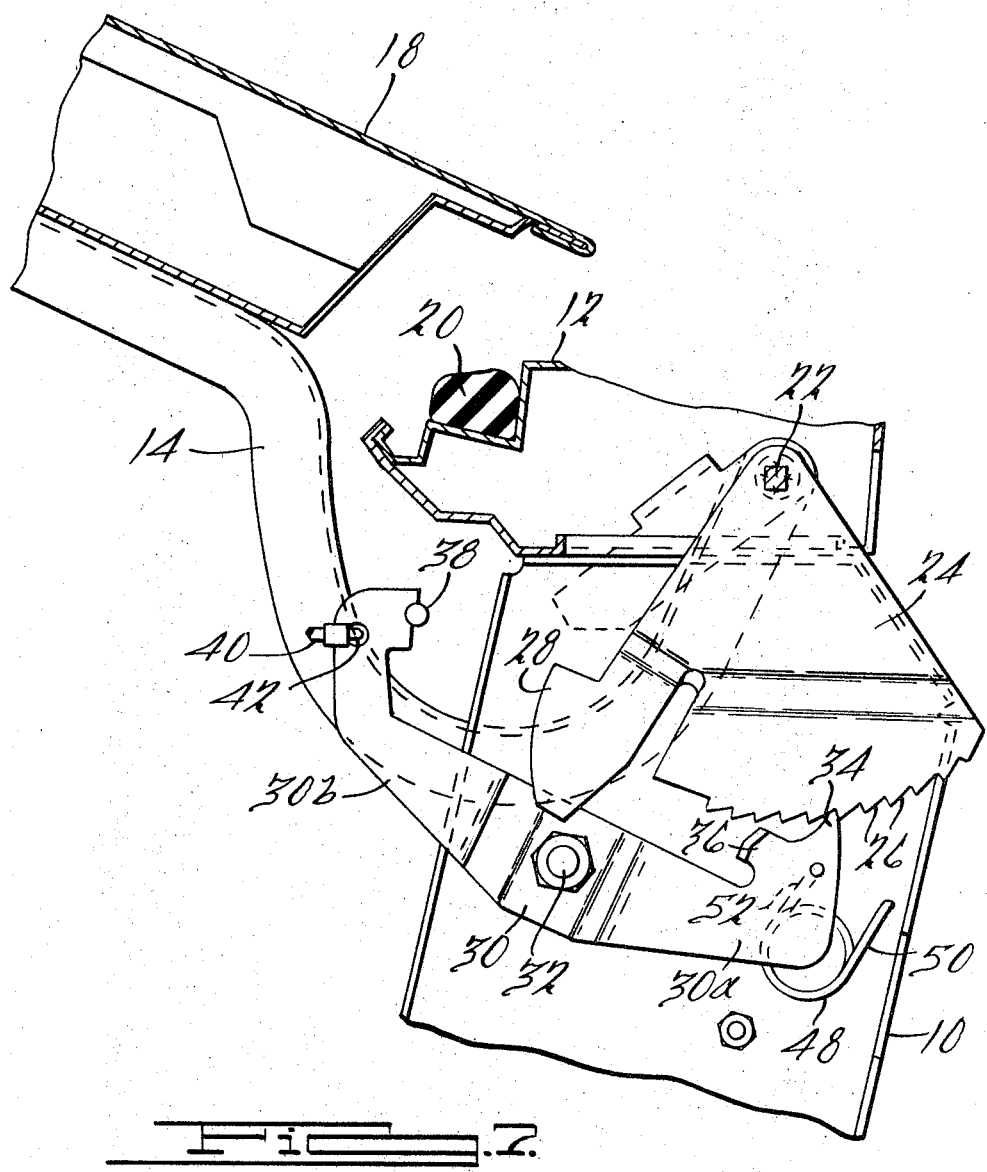

---

3,525,687
HINGE MECHANISM FOR POSITIONING A VEHICLE DECK LID
Peter M. Ross, Livonia, and Dennis N. Tino, Dearborn, Mich., assignors to Ford Motor Company, Dearborn, Mich., a corporation of Delaware
Filed Apr. 1, 1968, Ser. No. 717,504
Int. Cl. B62d 25/10
U.S. Cl. 296—76     12 Claims

ABSTRACT OF THE DISCLOSURE

A hinge mechanism that permits conventional pivotal movement of a vehicle luggage compartment closure or deck lid between a closed position and an open position and provides for holding the deck lid in intermediate open positions when oversize loads are carried in the luggage compartment such that the deck lid cannot be closed. This is accomplished by actuation of a ratchet mechanism that allows deck lid movement towards the closed position until the load is contacted, and prevents deck lid movement away from the closed position until the ratchet mechanism is released.

BACKGROUND OF THE INVENTION

A conventional luggage compartment lid or rear deck lid is pivotally secured to a vehicle body structure so that it is swingable between closed and opened positions. A latch is engaged to hold the deck lid in the closed position while the force of resilient means, such as torsion bars, urge the deck lid into an open position when the latch is disengaged.

Upon an oversize load being carried in the luggage compartment so that the deck lid cannot be closed and the latch engaged, it is common practice to tie down the deck lid against the load so that the forces arising during the vehicle operation will not cause free movement of the deck lid. Such movement could result in damage to the deck lid or the hinge means securing the deck lid to body structure. An unsecured rear deck lid also results in an undesirable blocking of the vehicle operator's rear view and an attendent impairment of safe vehicle operation.

Tying down a deck lid against an oversize load with rope or twine is a cumbersome and often ineffective procedure. The many sharp metal edges present in vehicle body structure and the deck lid latch mechanism tend to sever tie-down materials as the latter are stressed by forces occurring during vehicle operation. Also, road shocks and vibration may loosen knots in the tie-down material to the extent that the deck lid may move freely.

It is, therefore, an object of this invention to provide vehicle deck lid positioning mechanism that allows conventional deck lid movement between closed and opened positions. This mechanism includes selectively operable ratchet means that permit the deck lid to be moved towards the closed position and into contact with an oversize load while preventing deck lid movement away from the closed position. These means easily are rendered operative by a predetermined movement of the deck lid and are returned to an inoperative condition by manual operation of a control means or by closing the deck lid.

SUMMARY OF THE INVENTION

A vehicle deck lid positioning mechanism constructed in accordance with this invention is intended for use in a motor vehicle having body structure defining a compartment and an access opening to said compartment. A closure member for said opening is pivotally mounted on said body structure for swinging movement between a fully closed position and a first open position. Resilient means operatively secured to the body structure exert a force on the closure member urging the latter towards the first open position. Cooperating closure member positioning means are operatively secured to the body structure and the closure member and are intermittently engageable to overcome the force exerted by the resilient means and thereby hold the closure member in one of a plurality of open positions between the closed position and the first opened position. These positioning means comprise a ratchet mechanism including a ratchet segment having teeth formed thereon and operatively secured to said closure member for unitary movement therewith. A pawl is pivotally secured to the body structure and is movable between an inoperative position and an operative position in which a portion of the pawl lies in the path of movement of the ratchet segment teeth. Actuating means secured to the closure member for unitary movement therewith contact the pawl and urge the latter into an operative position upon the closure member being moved to an open position remote from the closed position relative to the first open position. Manually operable control means is secured to pawl and is actuatable to urge the pawl into an inoperative position.

DESCRIPTION OF THE DRAWINGS

FIG. 1 is a side elevation view, partially in section, of a portion of a motor vehicle and illustrating vehicle deck lid positioning mechanism constructed in accordance with this invention and viewed from outboard of said mechanism;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 3 and illustrating the mechanism of this invention with the deck lid in the closed position;

FIG. 5 is a view similar to FIG. 4 but illustrating the mechanism of this invention with the deck lid in the normal open position;

FIG. 6 is a view similar to FIG. 5, but illustrating the mechanism of this invention in the fully open or ratchet actuating position; and FIG. 7 is a view similar to FIG. 6 but illustrating the mechanism of this invention with the deck lid in a partially open position and the ratchet mechanism actuated.

DETAILED DESCRIPTION OF THE INVENTION

Referring now in detail to the drawings and in particular to FIGS. 1 and 3 thereof, the numeral 10 denotes a portion of a vehicle body structure commonly referred to as a rear quarter panel. This body structure partially defines a luggage compartment or vehicle trunk. The uppermost portion of body structure 10 comprises a rear cowl 12. A hinge member 14, having an arcuate profile, is pivotally secured to body structure 10 by means of a shaft 16. The end of hinge member 14 remote from shaft 16 is secured to the rear deck lid 18. The deck lid acts as a closure member for the access opening to the vehicle luggage compartment. An elastomeric seal 20 provides a weathertight fit between deck lid 18 and rear cowl 12.

A torsion bar 22 is secured, as by welding, to shaft 16. It thus may be seen that hinge 14, shaft 16 and torsion bar 22 operatively are secured together for unitary rotational movement. The torsion bar arrangement illustrated is conventional in that upon deck lid 18 being unlatched, the force exerted by the resilient torsion bar 22 will urge deck lid 18 into an open position.

A ratchet segment 24, having a plurality of ratchet teeth 26 formed thereon, is secured to torsion bar 22 for unitary rotation therewith. Integrally formed with ratchet segment 24 and projecting therefrom is an actuating finger 28.

An elongate pawl 30 is pivotally secured to body structure 10 by means of a fastener 32. One end 30a of pawl 30 has formed thereon a pointed projection 34 and a flat projection 36. The other end 30b of pawl 30 is hook-shaped and has formed thereon a circular cam follower 38.

A control rod 40 is pivotally secured at point 42 to end 30b of pawl 30. Control rod 40 extends rearwardly along the edge of body structure 10 that defines the luggage compartment access opening. As may be seen from FIG. 2, a control rod mounting member 44 having an integral channel formed therein and secured to body structure 10 by means of a fastener 46, supports control rod 40 midway along its length.

An over-center spring 48 has one end 50 thereof secured to body structure 10 and its other end 52 secured to end 30a of pawl 30.

The functioning of spring 48 as well as the operation of the other parts described above best may be appreciated by reference to FIGS. 4 to 7. It is important to note that FIGS. 4 to 7 illustrate the parts described above as viewed from inboard of these parts, while FIG. 1 illustrates these parts as viewed from outboard of their location.

FIG. 4 illustrates the apparatus of this invention when deck lid 18 is in a closed position. Deck lid 18 and body structure at the rear of the vehicle have cooperating latch means formed thereon to hold deck lid 18 in the closed position illustrated against the force exerted on the deck lid by torsion bar 22. It may be seen from FIG. 4 that at this time pawl 30 is positioned such that pointed projection 34 is remote from the path of movement of ratchet teeth 26. Ratchet teeth 26, with ratchet segment 24 and finger 28, will move, of course, in rotation about a center located at torsion bar 22. With deck lid 18 closed as illustrated in FIG. 4, pawl 30 must be in this position due to contact between finger 28 and flat projection 36 formed on pawl end 30a.

Upon the latching mechanism associated with deck lid 18 being disengaged, torsion bar 22 will exert a force on hinge member 14 urging hinge member 14 and deck lid member 18 into the first open position illustrated in FIG. 5. This is the normal open deck lid position. During the opening of deck lid 18 due to the force of torsion bar 22, pawl 30 is held in the same position illustrated in FIG. 4 due to a force exerted on this pawl by over-center spring 48. With pawl 30 in this position, pointed projection 34 does not engage ratchet teeth 26 as projection 34 is remote from the path of movement of teeth 26 as described above. As may be seen from FIG. 5, finger 28 has moved into intimate contact with cam follower 38 carried by end 30b of pawl 30. The force exerted by torsion bar 22 is not sufficient, however, such that finger 28 will press against cam follower 38.

If an oversize load is to be carried in the vehicle luggage compartment so that a complete closing of deck lid 18 is impossible, this invention provides that a ratchet mechanism may be actuated manually by the vehicle operator so that deck lid 18 may be closed partially, brought into intimate engagement with the oversized load and held against the load despite the force exerted by torsion bar 22 on deck lid 18. This manual actuation of the ratchet mechanism is accomplished by uring deck lid 18 into a second open position that is remote from the closed position relative to the first open position illustrated in FIG. 5. For ratchet actuation, therefore, deck lid 18 is urged into the position illustrated in FIG. 6 wherein deck lid 18 and hinge member 14 are moved pivotally in a clockwise direction as viewed in FIGS. 5 and 6 from the deck lid position of FIG. 5. This clockwise movement causes finger 28 to act as a cam and bear against cam follower 38, thereby causing a counterclockwise movement of pawl 30 such that pointed projection 34 is moved upwardly and into the path of movement or ratchet teeth 26. The force exerted by finger 28 against cam follower 38 is sufficient to overcome the force of over-center spring 48. Upon pawl 30 being forced into the position illustrated in FIG. 6, over-center spring 48 operates to hold pawl 30 in this position.

With the parts positioned as illustrated in FIG. 6, deck lid 18 may be moved counterclockwise and brought into contact with the oversize load, a position illustrated in FIG. 7. With the ratchet mechanism actuated and deck lid 18 partially closed and bearing against the oversize load, pointed projection 34 engages one of the teeth 26 carried by ratchet segment 24. This engagement between projection 34 and one of the teeth 26 holds deck lid 18 in any one of a plurality of positions against the force exerted by torsion bar 22. The motor vehicle associated with this apparatus thus may be driven with an oversize load in the luggage compartment without fear that unimpeded movement of deck lid 18 will cause damage to this member or the hinge mechanism connecting the deck lid to body structure. Also, the need for tying down deck lid 18 when an oversize load is carried is obviated.

When it is desired to release the ratchet mechanism of this invention so that force of torsion bar 22 will urge deck lid 18 into the open position illustrated in FIG. 5 so that the oversized load may be removed from the luggage compartment, the vehicle operator need only grasp the end of control rod 40 remote from pawl 30 and urge rod 40 to the right as viewed in FIGS. 4 to 7. This manual movement of control rod 40 will overcome the force of over-center spring 48 and return pawl 30 into the position illustrated in FIGS. 4 and 5, resulting in a disengagement of pointed projection 34 and ratchet teeth 26. With pawl 30 and ratchet teeth 26 thus disengaged, deck lid 18 may be opened and closed in the conventional manner.

In the event that the ratchet mechanism of this invention inadvertently is actuated by the vehicle operator when trunk lid 18 is open, (as by bumping deck lid 18 with luggage or other materials being loaded into the vehicle luggage compartment), a deactuation of the ratchet mechanism automatically will occur upon deck lid being closed into the position illustrated in FIG. 4. This automatic deactuation of the ratchet mechanism occurs since finger 28 will move counterclockwise when the deck lid 18 is closed and will contact the flat projection 36 on pawl end 30a. The pawl thereby is urged into the deactuated position illustrated in FIGS. 4 and 5.

It thus may be seen that this invention provides a vehicle deck lid positioning apparatus that allows the deck lid to be opened and closed normally when desired, but that provides for selective actuation of a ratchet mechanism upon an oversized load being carried in the vehicle passenger compartment. This ratchet mechanism allows the deck lid to be closed partially against the oversize load and held in this partially closed position against the force exerted by the conventional torsion bar that biases the vehicle deck lid towards a normal open position. This ratchet mechanism easily may be actuated manually by moving the deck lid into a more fully open position than that caused by the force of the torsion bar. The ratchet mechanism easily may be deactuated manually by movement of a control rod and, in the event of inadvertent or accidental actuation of the ratchet mechanism this mechanism automatically will be deactuated upon a closing of the deck lid.

We claim:

1. A hinge mechanism for a closure member pivotally mounted on a vehicle body structure for movement between closed and open positions relative to a compartment, said hinge mechanism comprising resilient means connected to said closure member and normally urging the latter toward a first open position, and cooperating closure member positioning means operatively secured to said body structure and said closure member and selectively engageagle to overcome the force exerted by said resilient means and mechanically lock the closure member against movement toward said first open position in one of a plurality of open positions between said closed position and said first open position.

2. The hinge mechanism of claim 1, wherein said closure member is free to be moved toward said closed position means when said positioning means are engaged.

3. The hinge mechanism of claim 1, wherein said positioning means include a ratchet mechanism.

4. The hinge mechanism of claim 1, wherein said positioning means include a ratchet segment having teeth formed thereon and operatively secured to said closure member for unitary pivotal movement therewith, and a pawl pivotally secured to said body structure and movable between an inoperative position and an operative position wherein a portion of said pawl lies in the path of movement of said teeth.

5. The hinge mechanism of claim 4, including manually operable control means secured to said pawl and capable of urging said pawl into the inoperative position.

6. The hinge mechanism of claim 4, including an over-center spring operatively secured to said body structure and said pawl and exerting forces on said latter urging said pawl toward the operative or inoperative position.

7. The hinge mechanism of claim 4, wherein said closure member is capable of movement to a second open position remote from said closed position relative to said first open position, and said positioning means further include a pawl activating finger secured to said ratchet segment for unitary movement therewith, said finger contacting said pawl and urging the latter into the operative position upon movement of said closure member into the second open position.

8. The hinge mechanism of claim 7, wherein said finger contacts said pawl and urges the latter into the inoperaitve position upon said pawl being in the operative position when said closure member is moved to the closed position.

9. In a motor vehicle, body structure defining a baggage compartment and an opening providing access to said compartment from exterior of the vehicle, a closure member for said opening pivotally mounted to said body structure and movable from a closed position to a plurality of open positions, resilient means connected to said closure and exerting a force urging said closure away from said closed position, and ratchet means operatively secured to said body structure and said closure and capable of locking said closure against movement away from said closed position.

10. In a motor vehicle according to claim 9, further including intermittently operable control means operatively secured to said closure member and urging said ratchet means into the operative condition upon said closure member being moved to a predetermined position.

11. In a motor vehicle according to claim 10, wherein said predetermined position is the open position most remote from said closed position.

12. In a motor vehicle according to claim 10, further including resilient means exerting a force urging said closure means towards an open position between said closed position and said predetermined position.

References Cited

UNITED STATES PATENTS

| 2,160,485 | 5/1939 | Obrecht | 16—143 |
| 2,188,052 | 1/1940 | Lavigne | 16—146 X |
| 3,153,260 | 10/1964 | Gionet | 16—145 X |

BENJAMIN HERSH, Primary Examiner

J. A. PEKAR, Assistant Examiner

U.S. Cl. X.R.

16—143